Figure 1:
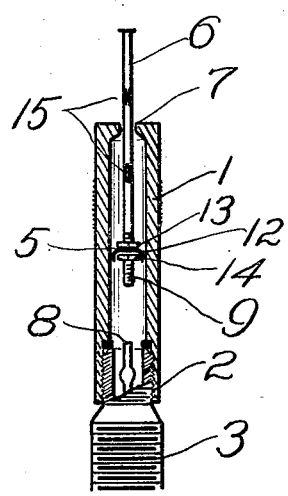

Oct. 2, 1928.

R. V. MORSE 1,686,165

TIRE GAUGE

Filed April 12, 1926

Robert V. Morse
INVENTOR

Patented Oct. 2, 1928.

1,686,165

UNITED STATES PATENT OFFICE.

ROBERT V. MORSE, OF ITHACA, NEW YORK.

TIRE GAUGE.

Application filed April 12, 1926. Serial No. 101,479.

This invention relates to pressure gauges, particularly to gauges to be used on automobile tires, and has for its object the production of a tire gauge sufficiently simple and cheap so that it can be generally used in place of the ordinary valve cap. The idea of leaving a pressure gauge permanently attached to each tire of a car so that the owner could inspect his tire pressures at any time without unscrewing a number of caps and getting dirty is not new—a great variety of more or less elaborate devices having been proposed.

All the known tire gauges capable of reading tire pressure comprised at least three parts or groups of parts, in general, (1) a case or chamber, (2) an airtight movable element which could be forced along by air pressure, (3) a calibrated element such as a spring adapted to resist the motion or balance the pressure, so as to bring the movable element to rest and determine the amount of pressure. The full air pressure of the tire remained on the apparatus during the determining operation.

The accuracy of workmanship necessarily involved in such a solution made any such apparatus too expensive to meet the particular practical requirements of the problem. One of the objects of this invention has been to provide a practical means for reading such pressures operating on a different principle. Another object was to provide a gauge which was simple, cheap, and effective for the purpose for which it was intended. A further object was to arrange it so that it could be readily adapted to either high pressure or low pressure tires, to afford ease in manufacture, and various other objects as will become apparent.

Inasmuch as the principle used in measuring the air pressure in this tire gauge is somewhat novel, I will first describe it in relation to the combination of physical laws involved, and then describe a tire gauge in its special application. Briefly, by way of introduction, the method may be described as trapping a certain volume or mass of the air under the pressure to be measured, then promptly allowing this air to expand to atmospheric pressure (before it has a chance to leak appreciably) and then measuring the increase in volume, which will be a measure or indication of the original pressure. Take, for example, a free and frictionless piston in a cylinder, the piston being locked against motion until a known volume of air under the pressure has been placed behind it, and then the piston released and shot forward against atmospheric pressure on the other side, so that it will oscillate until it comes to rest with equal pressures on both sides. Then its travel would indicate the initial pressure that had been put behind it. This simple illustration, while serving to introduce the method, does not take into account the forces as they actually exist, for example, any piston has friction, particularly if it fits close enough to be air tight. There is also the inertia effect or momentum of the piston once it has begun to move, which tends to carry it past the position of equilibrium, after which friction will generally hold it from oscillating or returning to the proper point. The consideration of the free and frictionless piston problem does not therefore of itself afford a solution. In addition to the friction and momentum difficulties, it was also necessary to provide some means for relieving the air pressure under the piston so that the piston could be returned to its initial position when desired; and also means had to be provided to cut off the air at the desired point in order to insure that a correct given volume was being expanded. Above all, the prime requisite was a reduction in the number of parts as no solution which involved added expanse or complexity could be of any practical value for this particular problem.

Figure 2:
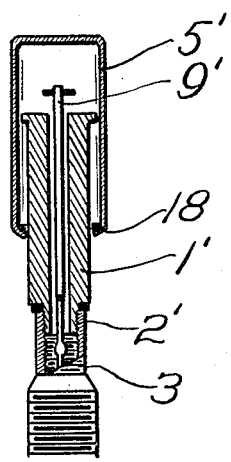

Referring now to the drawings which show by way of illustration typical examples of my invention, Fig. 1 is a view in cross-section showing one form of tire pressure gauge, and Fig. 2 is a similar view of another modification. Their structure and principles on which they operate will now be described in more detail.

Referring now to Fig. 1, the cap 1 is provided with a threaded portion 2 by which it can be attached to the tire valve stem 3. The exterior of the cap 1 may be knurled or have flat sides if desired to give a good grip for the hand in screwing on or off. A gasket may be provided to make a tight joint between the cap 1 and the valve stem 3, though if the threads 2 of the cap are well cut and a good fit a gasket is unnecessary. In the modification shown in Fig. 1, the cap 1 comprises the cylinder or chamber member of the device. Within the cap 1 is a piston 5 secured to a piston rod 6, which extends up thru a hole 7 in the top of the cap 1, and is sufficiently long so that it will project beyond the cap when the lower end is in contact with the valve pin 8 of the ordinary tire valve in the tire valve stem 3. The lower end 9 of the piston rod 6 or some equivalent projection extends below the piston 5 and it is the length of this projection 9 which largely determines the amount or volume of the high pressure air which is trapped to be measured, as will be described. The piston 5 is relatively small in diameter, generally smaller than the diameter of the valve stem 3, and is preferably screwed on the piston rod 6, the lower end 9 of which is threaded for some distance in order to allow the piston to be adjusted to various locations in the manufacturing—the projection of the portion 9 being in general small for high pressure tires and larger for low pressure or balloon tires. The piston 5 may be of any suitable material, and in the form illustrated it consists of a leather plunger 12 held between two hexagonal nuts 13 and 14. The upper portion of the piston rod 6 which extends through the hole 7 in the cap is smooth so as to slide freely and may be provided with markings or bands 15 indicating pressures or ranges of pressures.

The degree of friction of the piston 5 in the cylinder or cap 1 is an important factor in the manufacture of the gauge, since the friction is necessary to overcome or substantially balance the momentum of the piston when in motion under an impulse of air, and the friction is also required to hold or retain the piston 5 and rod 6 in their final position so that a reading may be taken. With too little friction the piston will overtravel and then drop back so as not to permit a reading—and will also in all probability let the air leak by too fast. If the piston is too tight, or there is too much friction, the gauge will not operate with a sufficient degree of accuracy, and if there is no air leakage at all the piston rod 6 cannot be pushed down to its initial position for a second reading, or to leave it in a protected position as is often desired. In order to ascertain the amount of friction a convenient test is to place the gauge to the lips and blow, first holding the piston rod 6 from moving, to see if the air leaks by the piston appreciably, and then releasing the piston rod to see if lung pressure will suffice to overcome the friction of the piston and move it. If so, the gauge is sensitive to a pound or two per square inch which is sufficiently close for tire work. The degree of friction or tightness of the plunger 12 can be adjusted by means of the nuts 13 and 14, which as they are screwed closer together squeeze the plunger 12 outward and increase its outer diameter, affording a delicate and efficient control of this important factor.

Assuming we have the completed unit, with a piston having the proper degree of friction and sufficiently air tight to prevent any appreciable loss of air for a second or two, yet having enough leakage so that if the piston is pressed down a few times gently the air beneath will leak out in a few seconds and permit the indicator to assume its zero position—then the operation is as follows: The projecting piston rod 6 is first pushed down with the finger, causing the lower end 9 to push down the valve pin 8 in the valve stem 3, thus opening the tire valve, and permitting the air under tire pressure to fill the space below the piston 5. This space remains so filled as long as the valve is thus held down—any leakage past the piston 5 or through the thread 2 being replaced by more air from the tire. When the finger is lifted off the end of the rod 6, the piston 5 is immediately impelled upward, and as it does so the lower end 9 is lifted off the valve pin 8 permitting the tire valve to close and cut off the air. At the instant this cut-off occurs a certain volume of air at full tire pressure is trapped beneath the piston 5. The piston is at this instant moving in its outward travel so that even if the apparatus is not strictly air tight there is little time for leakage and no great loss of air before the piston has completed its travel and made the indication of pressure. The piston will continue to travel until the air behind it has expanded to substantially the same pressure as the atmosphere. Owing to the friction of the piston 5, the rod 6 remains where it is pushed, and from the amount it projects the owner can judge the approximate amount of pressure in his tire. If he wants to repeat the test, he pushes the rod 6 gently down again, permitting the air underneath the piston 5 to gradually escape, which it normally does by leakage in a few seconds. When the lower end 9 touches the valve pin 8 an added resistance can be felt, and the device is now ready for a new operation, which is obtained by pressing the rod 6 and then releasing it as described. In releasing the rod 6 it should not be snapped or bounced, as then the force of the spring within the tire valve is likely to add an extra impetus giving an excessive reading. If, however, the finger is removed in the normal way, the speed at the instant of cut-off will not be great, and the indication will be almost wholly dependent on the air pressure.

There is thus obtained a device capable of reading tire pressures in a practical manner, and consisting of a smaller number of operating elements than has heretofore been possible in an operative pressure indicator for this purpose. It will be noted that for the cut-off valve mechanism I utilize the ordinary valve which is already embodied in every tire, so that it does not add in any way to the cost of the pressure gauge, and neither does it have to be removed before the gauge can be applied. This also assures the owner that the new gauge will not cause his tires to leak.

It will be obvious to those skilled in the art that tire gauges embodying the principles I have described—automatic cut-off, immediate expansion, and frictional retention, etc.—may be embodied in a large number of structural forms, for example, in the form shown in Fig. 2 the lower end of the cap 1' is threaded at 2' to screw internally, instead of externally, on the valve stem 3. Furthermore, the piston or movable element 5' is shown as an external cylinder, instead of an internal plunger, and the pin 9' corresponds to the lower or metering rod 9 of the construction in Fig. 1. The pin 9' in Fig. 2 may either be loose or may be attached to the element 5'. In either case, the pin 9' is loose in the hole of the element 1' in order to permit the air to flow by it. A packing 18 at the rim or base of the movable element 5' corresponds to the leather washer 12 and prevents the immediate escape of the air. The operation is the same as has been described—when the element 5' is pushed down by the finger the pin 9' opens the tire valve and when the finger is removed the expansion of the certain amount of trapped air pushes the element 5' upward to indicate the amount of pressure—the element 5' being retained in its final position by friction, until it has been read, and being capable of being reset owing to air leakage.

While I have described certain particular forms of the device by way of example or illustration, it will be understood that the apparatus is susceptible to various modifications and adaptations as will be apparent to those skilled in the art, without departing from the scope of my invention, which is specified in the following claims:

1. In a pressure gauge, the combination of a movable element and a fixed element cooperating to form a substantially air tight expansible chamber, one of said elements adapted to be attached to a self closing valve to render the chamber air tight, a metering element between the movable element and the valve arranged to insure that a definite volume of air may be trapped between the movable element and the valve when the valve becomes closed, and means for indicating the amount of travel of said movable element as a result of the expansion of the trapped air until the air pressures on both sides of the movable element are substantially equalized.

2. In a tire pressure gauge, the combination of a chamber adapted to be attached to a tire valve stem, a freely movable piston within said chamber, restrained only by friction and the surrounding air, a piston rod extending outside of said chamber whereby the piston may be moved or its motion observed, and a projection on the other side of the piston adapted to open the tire valve when the piston rod is pushed thereagainst, whereby a certain volume of air may be trapped beneath the piston and then allowed to expand to substantially atmospheric pressure so that the tire pressure may be indicated by the travel of the piston.

3. In a tire pressure gauge, the combination of a cap having screw threads at one end adapted to be attached to a tire valve stem, an elongated cylindrical chamber extending the major portion of the length of said cap and being smaller in diameter than the outer diameter of said screw threads, and terminating in a still smaller hole thru the other end of the cap, a freely movable piston within said cylinder, restrained only by friction and the surrounding air, a piston rod fitting loosely in said smaller hole in the end of the cap and extending beyond the cap, and a projection on the other side of the piston adapted to open the tire valve when pressed thereagainst and to trap a certain volume of air beneath the piston when released whereby the piston rod may be projected by the expansion of such entrapped air in various amounts beyond the cap to indicate various degrees of tire pressure.

4. In a tire pressure gauge, the combination of a cap having screw threads at one end adapted to be attached to a tire valve stem, an elongated cylindrical chamber extending the major portion of the length of said cap, and being smaller in diameter than the outer diameter of said screw threads and terminating in a still smaller hole thru the other end of said cap, a freely movable piston within said cylinder restrained only by friction and the surrounding air, a piston rod fitting loosely in said smaller hole in the end of the cap and extending beyond the cap, markings on said rod for reading the degree of tire inflation, and a projection on the other side of the piston adapted to open the tire valve when pressed thereagainst and to trap a certain volume of air beneath the piston when released, whereby the piston rod may be projected by the expansion of such entrapped air in various amounts beyond the cap to indicate various degrees of tire pressure.

5. A tire pressure gauge in combination a cylinder threaded at one end for engagement to a tire valve stem, a piston in said cylinder, a piston rod extending up thru the other end of the cylinder, a projection on the piston adapted to open the tire valve when the piston rod is pressed, the piston rod being sufficiently long so that it will extend above the top of the cylinder when the tire valve is thus opened, said piston being unrestrained in said cylinder except by friction, whereby it may be propelled in said cylinder by a pocket of air when the rod has been pressed down thereagainst to open the valve and then released, so that the travel of the piston and rod will then indicate the pressure of the air.

6. The method of measuring air pressure which consists of trapping a pocket of air at the pressure to be measured in a cylinder having a piston which is free to move except for friction, then releasing the piston so that it may be propelled by the said air expanding down toward atmospheric pressure until stopped by friction, whereby the amount of travel of the piston under the impulse gives an indication of the air pressure.

7. A tire pressure gauge comprising in combination a cylinder threaded at one end for engagement to a tire valve stem, a piston in said cylinder, a piston rod extending up thru the other end of said cylinder and having a screw thread at the one end, said screw threaded end projecting beyond the piston toward the tire valve whereby the tire valve may be opened when the piston rod is pressed, the piston being screwed upon said threaded end so that the volume of the pocket of air beneath it may be adjusted, said piston being unrestrained in said cylinder except by friction, whereby it may be propelled in said cylinder by a pocket of air when the rod has been pressed down thereagainst to open the valve and then released so that the travel of the piston and rod will then indicate the pressure of the air.

8. A tire pressure gauge comprising in combination a cylinder threaded at one end for engagement to a tire valve stem, a piston in said cylinder, a piston rod having markings for indicating pressure, said rod extending up thru the other end of said cylinder and having a screw thread at one end, said screw threaded end projecting beyond the piston toward the tire valve whereby the tire valve may be opened when the piston rod is pressed, the piston being screwed upon said threaded end so that the volume of the pocket of air beneath it may be adjusted, said piston being unrestrained in said cylinder except by friction, whereby it may be propelled in said cylinder by a pocket of air when the rod has been pressed down thereagainst to open the valve and then released so that the travel of the piston and rod will then indicate the pressure of the air.

In witness whereof I have hereunto set my hand this 31st day of March, 1926.

ROBERT V. MORSE.